Oct. 14, 1969
L. BUCALO
3,472,077
TEMPERATURE-COMPENSATED PRESSURE TRANSDUCER
Original Filed Feb. 13, 1967
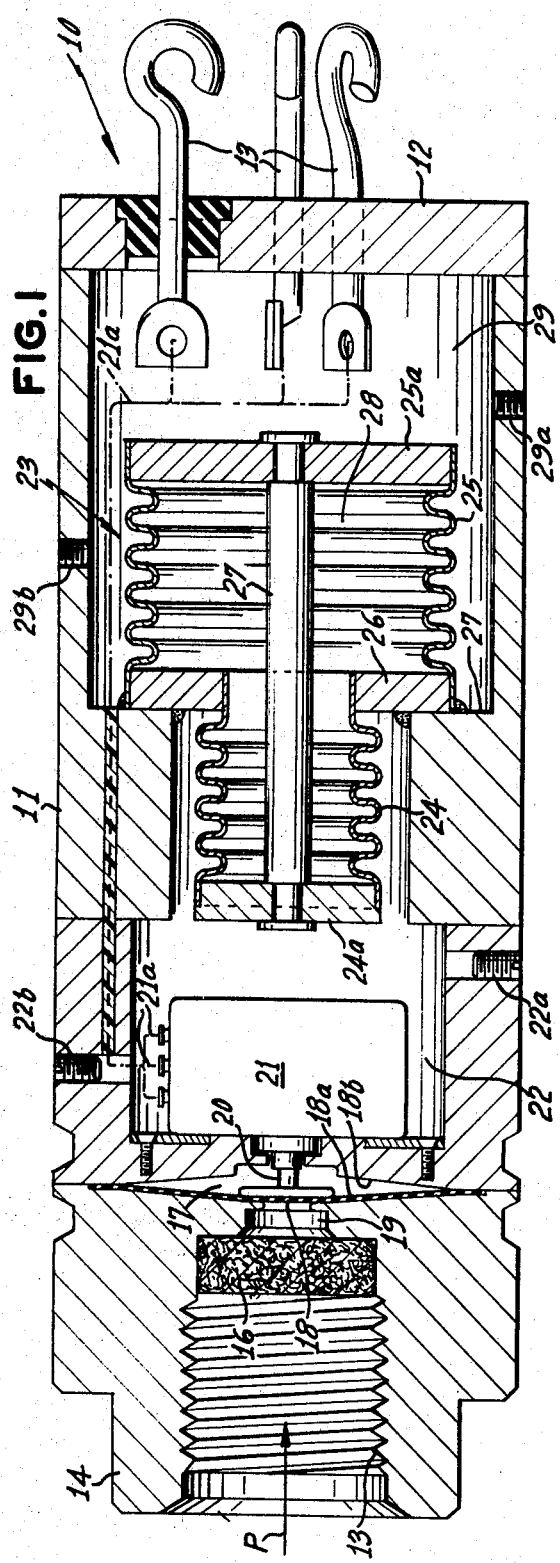
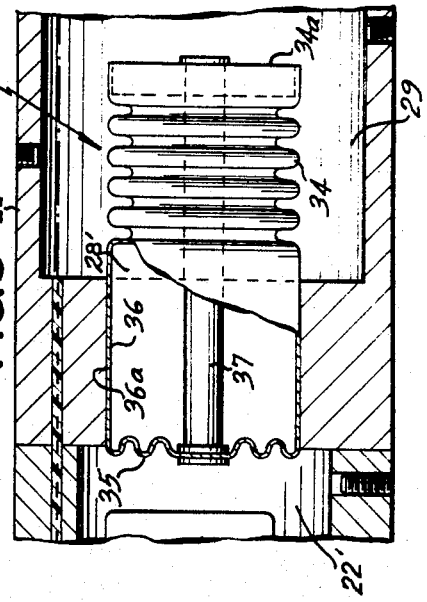
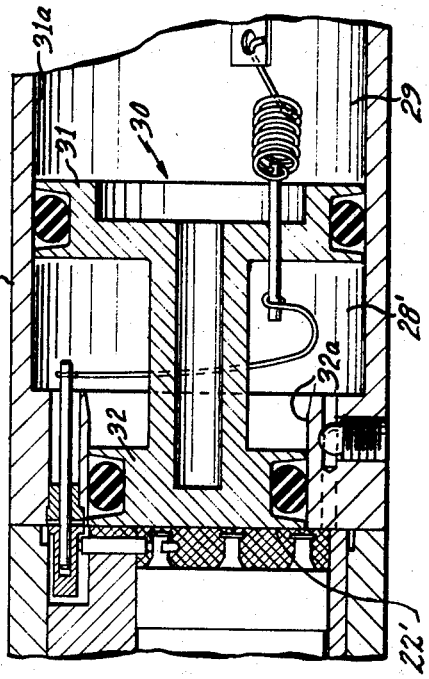
INVENTOR.
*Louis Bucalo*
BY
*McGregor & Eisenman*
ATTORNEYS

United States Patent Office 3,472,077
Patented Oct. 14, 1969

3,472,077
TEMPERATURE-COMPENSATED
PRESSURE TRANSDUCER
Louis Bucalo, Holbrook, N.Y., assignor to Kinemotive
Corporation, Farmingdale, N.Y., a corporation of New York
Continuation of application Ser. No. 615,763, Feb. 13, 1967. This application Sept. 20, 1968, Ser. No. 768,598
Int. Cl. G01d 19/04
U.S. Cl. 73—393      14 Claims

ABSTRACT OF THE DISCLOSURE

A transducer responsive to pressure changes and having a reference pressure chamber is temperature-compensated to maintain constant pressure over a range of temperatures by changing its volume as a function of temperature change. Reference volume change is effected by a dual compensating member having two movable portions containing a common temperature-sensitive mass which acts differentially on the two movable portions. One portion is part of the reference chamber and thus enlarges the chamber with increasing temperature and decreases it with decreasing temperature.

---

This application is a continuation of the copending application Ser. No. 615,763, filed Feb. 13, 1967, now abandoned.

This invention relates to temperature compensated sensing and regulating devices in which the energy required for actuating the device is a small percentage of its energy level. More particularly, it relates to devices such as pressure-responsive switches in which temperature compensation occurs continuously without sacrificing sensitivity.

The basic problem of obtaining a reference pressure which is precisely temperature-compensated is encountered in the design of a wide range of sensing and regulating devices, including pressure-sensitive switches, altitude or depth sensors, flow and acceleration switches, temperature switches, high-performance pressure regulators, constant-pressure volume compensators in sealed liquid systems, and the like. Temperature compensation of such reference pressure devices typically results in decreased sensitivity or the introduction of errors or both. Large changes in the parameter under measurement are often required to obtain a useful output.

Accordingly, it is one object of the present invention to provide a range of highly sensitive sensing and regulating devices which respond to small variations in pressure and afford a useful output and which at the same time are temperature compensated.

Another object of the invention is to provide sensing and regulating devices which can be readily adapted for use at any selected level over a wide range of pressures, which can be hermetically sealed, and which are not subject to damage by extraordinary pressure changes.

In accordance with the present invention, a pressure-sensitive switch or related device can be provided in which there is a captured reference pressure against which a sensing element, such as a flexible diaphragm, can be operated which is unaffected by temperature. This can be accomplished by providing a pressure reference volume which can be changed as a function of the change of temperature so that its own pressure change proportional to temperature is precisely offset.

In one embodiment of the invention, the compensation can take the form of a fluid-filled bellows working differentially into both tthe reference volume and a backup volume. Under increasing temperature the fluid-filled bellows, which is mounted on and referenced against a fixed frame or housing, expands into the backup volume and pulls with it a portion which intrudes into the reference volume, thereby increasing the latter to offset its own tendency to rise in pressure with the temperature increase. The output is sensed by exposing one side of a flexible diaphragm to the pressure to be sensed and the other side to the reference volume and coupling the movable portion of the diaphragm to an output device such, for example, as a switch.

The above, as well as other features and objects of the present invention, will be apparent from the following specification having reference to preferred embodiments thereof, referring to the accompanying drawing, in which:

FIGURE 1 is a view in longitudinal section of a pressure-sensitive switch which is temperature compensated;

FIGURE 2 is a fragmentary view of a portion of the unit of FIGURE 1 showing a modification thereof; and FIGURE 3 is a fragmentary view corresponding to FIGURE 2 and showing another modification.

Referring to the drawings, the invention is illustrated as embodied in a pressure-sensitive temperature-compensated switch unit identified generally by the numeral 10, and including a rigid housing 11, such as a metal cylinder, having a base 12 including suitable terminals or connectors indicated generally by the numeral 13, and an input pressure port 14 at the opposite end. The input port 14 is illustrated in the form of a threaded connector to which a pressure line can be connected and which includes an input duct 15 preferably fitted with a porous filter 16. Formed in the housing adjacent the input sensing end is a shallow circular chamber 17 in which is mounted movable sealing means in the form of a flexible circular diaphragm 18 secured around its perimeter to the walls of the housing 11 in hermetically sealing relationship. The left-hand side of the diaphrgam, as viewed in the drawing, is exposed to the input sensing pressure P through a duct 19, and is mechanically coupled on its opposite side by means of a push-rod 20 to an electrical switch 21.

The switch 21 can be selected to suit the particular requirements of the unit and can take the form, for example, of a snap switch, a push switch or the like, the leads 21a of which are passed to the terminals or connectors 13. The left- and right-hand walls of the chamber 17 form limit stops 18a and 18b for the diaphragm 18, thereby protecting it against extraordinary pressure changes which might otherwise damage the instrument. The volume to the right of the diaphragm 18, which includes the space in which the switch 21 is mounted and which is identified by the numeral 22, is closed, being sealed on its left-hand end by the diaphragm 18 and on its right-hand end by a temperature-compensated assembly indicated generally by the numeral 23. It is termed the reference volume.

The temperature compensator 23 is illustrated in the form of a pair of bellows sections 24 and 25, both secured to a common mounting element, in the form of an annulus 26, which is in turn secured to a shoulder 27 formed on the inside surface of the housing 11. The two bellows sections 24 and 25 are axially aligned and have their respective ends 24a and 25a rigidly connected by a tie rod 27 so that they move as one. The two bellows sections 24 and 25 embrace a common volume 28 which can be filled with a fluid, such as oil, having desired temperature-expansion characteristics. It will be observed that the bellows section 25 is larger in diameter than the section 24 so that, with rising temperature and hence expansion of the fluid within the volume 28, the assembly including the two ends 24a and 25a and the rigid connector 27 will move to the right to compress the bellows 24 and expand the bellows 25. In this fashion, the reference volume 22 will be enlarged as a function of increasing temperature.

This enlargement of volume is arranged to precisely offset the natural increase of pressure which would occur in the gas therein with the temperature change.

The bellows section 25 of the temperature compensator is disposed within a space 29 within the housing 11 which forms a backup volume, which serves as an equivalent to a spring load on the bellows 25. The volume 29 can be filled with gas through a sealed filling port 29a and the reference volume 22 can be filled with gas through a filling port 22a. In addition, volume-adjusting means in the form of screws 29b and 22b can be provided for effecting precision adjustments of the two volumes 29 and 22 respectively. If desired, for special cases, the volume 29 can be connected to the input pressure line or to another pressure source which might be available in the same area or environment in which the unit is used. Alternatively, rather than using a closed volume 29, a spring can be inserted between the end 25a of the bellows section 25 and the base 12, in which case the chamber or volume 29 can be vented.

In operation, the unit can be set to respond to increasing pressures of a very low magnitude by precisely setting the diaphragm 18 by controlled pressure within the volume 22. The diaphragm, when actuated through displacement due to pressure introduced through the fitting 14, will actuate the switch. A change in ambient temperature over a wide range will not induce a spurious output by virtue of the temperature-compensating assembly 23 which will act continuously to change the reference volume 22 upward or downward. Rising temperature will not cause a rise in the reference pressure in the volume 22 because the bellows 24 will contract or compress to the right as viewed in the drawing. With falling temperature, however, the bellows section 24 will expand by moving to the left to decrease the reference volume 22 so that the pressure therein will remain absolutely constant.

It will be understood that the gases in the volume 22 and the liquid in the volume 28, as well as the areas of the bellows sections 24 and 25, must be selected in accordance with the appropriate design parameters to achieve the desired end result. This can be accomplished mathematically and in addition to providing for direct or linear compensation, can be designed to provide for nonlinear compensation.

In a typical working unit the reference volume $V_R$, identified by the reference numeral 22, was 0.05 cu. in., the fluid medium $V_F$, identified by the reference numeral 28, was 0.244 cu. in., and the backup volume $V_B$, identified by the reference numeral 29, was 0.5 cu. in. The ratio of the effective working area of the bellows section 25 to the working area of the small bellows section 24 (both working areas corresponding approximately to the respective areas of the end sections 24a and 25a, less the cross-sectional area of the coupling shaft 27) was 1.55. Using a silicone oil as the fluid within the bellows, precise compensation over a temperature span of 250° F. was achieved.

Referring to FIGURE 2, there is illustrated a modification in which the temperature-compensating assembly takes the form of a differential piston assembly replacing the double bellows assembly 24-25 of FIGURE 1. This assembly includes a piston identified generally by the numeral 30, having a large end 31 and a small end 32 joined by a central shaft. The inside of the housing 11' (corresponding generally to the housing 11 of FIGURE 1) is formed with a first cylindrical section 31a to receive the large piston end 31 and a second cylindrical section 32a of smaller diameter to receive the small piston end 32. Sealing rings 31b and 32b can be included in the respective ends 31 and 32 to seal the fluid which is contained in the open space of volume 28' (which corresponds to the volume 28 in FIGURE 1) inside the piston assembly 30. As in the case of the embodiment of FIGURE 1, the gas-filled backup volume 29 resiliently urges the piston assembly to the left as viewed in the drawing and the captured volume of oil within the volume 28' determines the position of the assembly in the left hand position due to the incompressibility of the fluid. In operation, with the volume 28' filled with a suitable fluid, such as silicone oil, an increase in temperature will expand the fluid to exert a differential pressure on the two ends of the piston causing movement to the right, as viewed in the drawing, to enlarge the effective reference volume 22'.

Rather than using sealing rings or O rings in the piston assembly 30, closely spaced piston and cylinder walls which are matched to such degree of precision that they form molecular seals (formed in accordance with the applicant's copending application Ser. No. 588,231, filed Sept. 28, 1966) can be used. This can be accomplished by forming a piston having two sections of different diameter both precisely formed to be of uniform dimension with smoothly polished surfaces. The metallic cylinder is then deposited on the piston using a precisely dimensioned interface layer which is subsequently dissolved to establish the clearance, all as set forth in said copending application.

Referring to FIGURE 3, there is shown a modified temperature-compensating assembly 33 which can be used as a replacement for the assembly including the bellows sections 24 and 25 of FIGURE 1. A bellows section 34, including end piece 34a, corresponds generally to the bellows section 25 and end section 25a of FIGURE 1 and a diaphragm section 35 is provided in place of the bellows section 24. The bellows section 34 and the diaphragm section 35 can be formed as a single, integrated unit including a central, cylindrical mounting section 36. Together with the end section 34a, the compensating assembly 33 defines a closed or sealed volume filled with a suitable temperature-sensitive fluid, such as silicone oil. A coupling or connecting shaft 37 is joined to the movable end section 34a of the bellows portion 34 and to the movable center portion of the diaphragm. Thus the movable parts of the assembly move as one. The assembly is secured in the housing by soldering or welding the central cylindrical wall section 36 in a fluid-tight seal to the opposing cylindrical housing surface 36a. When so mounted, the operation of the unit will be substantially the same as the temperature-compensating assembly of FIGURE 1, with the diaphragm section 35 being pulled to the left to enlarge the reference volume 22' when the fluid expands with rising temperature, and to the right to decrease the reference volume with falling temperature, as the fluid contracts. This action in the assembly 33 is based on the fact that the effective area of a diaphragm is approximately one-third of its total area whereas the effective area of a bellows is its mean diameter. For certain applications, two diaphragms of different diameters can be used.

Other forms and arrangements will suggest themselves to those skilled in the art and the invention should not, therefore be regarded as limited.

I claim:

1. Compensated sensing and regulating apparatus comprising a housing defining a closed volume adapted to retain a reference pressure, input means to introduce a pressure to be sensed against the reference pressure and including an input conduit, movable sealing means separating the input conduit from the reference pressure volume and movable in response to relative pressure differentials therebetween, output means actuated by the movable sealing means, and temperature-compensating means movable in response to temperature change to change the reference volume directly as a function of temperature change comprising first and second movable members at least partially bounding a common fluid-filled volume and having different effective working areas, whereby in response to pressure change within the fluid-filled volume they move with different output forces, means coupling the movable members to move as one, said members being resiliently positioned, and means to mount the compensating means in the housing with the exterior of one of the movable members in communication with and partially bounding the reference volume to change that volume as a function of temperature.

2. Apparatus as set forth in claim 1, one of said movable members being a bellows and the other a diaphragm.

3. Apparatus as set forth in claim 1, said temperature-compensating means comprising bellows means including two bellows sections of different size and defining internally a common fluid-filled volume, each bellows having a movable end portion, means connecting the movable end portions of the bellows sections together to move as one, means to mount the bellows means to place one of the two bellows sections in communication with said reference volume to displace a portion thereof, said bellows being filled with a temperature-sensitive fluid whereby upon change in temperature the bellows section in communication with the reference volume is moved as a function thereof to maintain the reference pressure substantially constant with change in temperature.

4. Apparatus as set forth in claim 3, the smaller of said bellows sections being in communication with said reference volume, whereby upon expansion of the fluid within the bellows means the smaller bellows section is compressed under the force of expansion of the larger bellows section.

5. Apparatus as set forth in claim 4, said bellows sections having a common mounting base between the sections, means to secure the mounting base in sealing relation to the housing, said sections being aligned axially with their movable ends being disposed on opposite sides of the common base, said means to connect the movable portions comprising a tie rod extending therebetween and passing through an opening in the base.

6. Apparatus as set forth in claim 5, including a wall means defining a closed backup volume surrounding the larger bellows section, said volume being gas-filled to afford an axially resilient backup for the two bellows.

7. Apparatus as set forth in claim 6, said reference and backup volumes being contained within a common housing and divided by a barrier wall to which the common base of the two bellows sections is attached in sealing relationship.

8. Apparatus as set forth in claim 5 including spring means reacting between the housing and the bellows means to resiliently position the two bellows axially.

9. Apparatus as set forth in claim 1, said temperature-compensating means comprising a piston having ends of a different area and having an internal fluid-filled volume, cylinder means to receive said piston including a first section having a small cross-sectional area to accommodate the small end of the piston and a large cross-sectional area to accommodate the large end of the piston, the respective piston ends engaging the cylinder walls in sealing relationship with the piston ends and the cylinder walls defining the fluid-filled volume, whereby upon change in internal fluid pressure, differential forces are exerted on the ends of the piston to move the piston, means to resiliently position the piston axially, and means placing the exterior of the small end of the piston in communication with the reference volume, whereby the reference volume increases with movement of the piston in the direction of the large end.

10. Apparatus as set forth in claim 9, said large cylinder section being extended axially beyond the large end of the piston, and a cylinder head closing the large cylinder section beyond the large piston to define a closed volume engaging the large end of the piston to afford resilient axial positioning.

11. As an article of manufacture, a temperature-compensating assembly comprising a container defining a volume and having a volume-displacing portion which displaces volume inversely as a function of temperature, first and second movable members of different effective area at least partially bounding the volume, a common support for the two movable members, means to couple the two movable members to move as one and an incompressible fluid filling the volume, whereby upon change of internal fluid pressure due to the expansion of the fluid with increase temperature the member having a larger effective area moves with the expanding fluid to drive the member having the lesser effective area into the fluid-filled space of the container.

12. An article of manufacture as set forth in claim 11, said movable members comprising a pair of axially aligned bellows of different diameter having their respective movable ends facing in opposite directions, both bellows being fixed to said common support, and a connecting rod joining the two movable ends.

13. An article of manufacture as set forth in claim 11, one of said movable members comprising a bellows and the other comprising a diaphragm, the diaphragm and the bellows having different effective areas, the connecting means joining the center of the diaphragm to the movable end portion of the bellows.

14. An article of manufacture as set forth in claim 13, said common support for the bellows and diaphragm comprising a substantially cylindrical portion between the periphery of the diaphragm and the fixed end of the bellows, the bellows, the cylindrical portion and the diaphragm being integrally formed.

References Cited

UNITED STATES PATENTS 2,487,213    11/1949    Bender _____ 92—1 XR
2,691,893    10/1954    Meyer _____ 73—407

LOUIS R. PRINCE, Primary Examiner

DONALD O. WOODIEL, Assistant Examiner

U.S. Cl. X.R.

73—398, 407, 410